June 28, 1938.  E. C. BARWICK  2,122,273
CONTROL OF ELECTRIC MOTORS
Filed Sept. 8, 1937
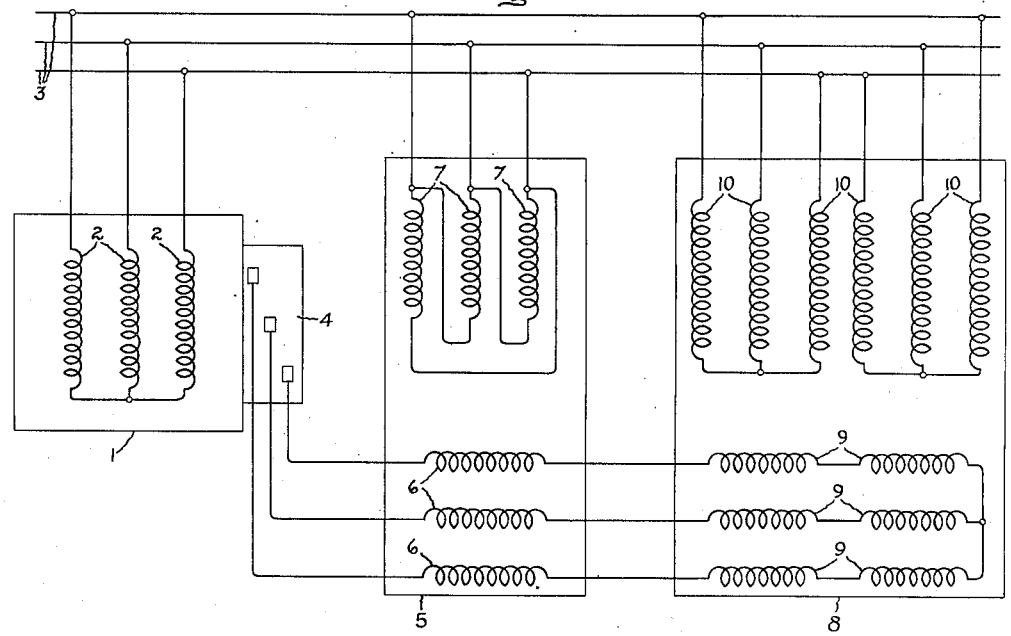
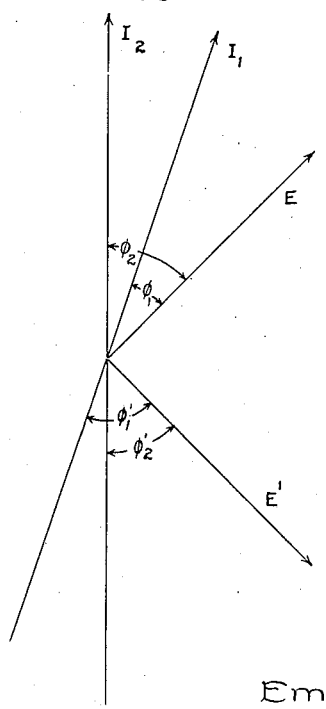
Inventor:
Emerson C. Barwick,
by Harry E. Dunham
His Attorney.

UNITED STATES PATENT OFFICE 2,122,273

CONTROL OF ELECTRIC MOTORS

Emerson C. Barwick, Pinner, England, assignor to General Electric Company, a corporation of New York Application September 8, 1937, Serial No. 162,903
In Great Britain November 5, 1936

2 Claims. (Cl. 172—276)

This invention relates to the control of electric motors and more particularly to motors of the shunt commutator type.

In using the shunt polyphase commutator motor controlled by means of a double induction regulator, it is found that a resultant torque is exerted by the regulator in some positions in spite of the fact that the fluxes rotate in opposite directions, and difficulties are thereby introduced when automatic speed control is used, as for example, in knitting machines. This torque is due to the secondary current bearing a different phase relationship to the voltage of one unit of the regulator from that of the other.

According to the present invention, I propose to inject a voltage into the secondary circuit by means of a transformer, an auxiliary winding on the motor stator, or other means, at a phase angle and of a magnitude such that it advances the phase of the secondary current sufficiently to bring the phase angles between the current and the two regulator voltages more nearly equal. This has the effect of bringing the torques due to the two units of the regulator more nearly equal and thereby reducing the resultant torque.

If a transformer is employed to obtain the injected voltage its primary will be connected in parallel with the primaries of the regulator and motor to the supply and its secondary connected in series with the regulator to the motor brushgear. The windings of the transformer are connected in such a way that its secondary voltage has a component 90° out of phase with the primary voltage. This may be done by connecting the primary of the transformer in delta or by a zig-zag connection of either of the windings, with equal or unequal components, or by other similar means.

If the injected voltage is obtained by using an auxiliary winding on the stator of the motor, its phase will be determined by its physical position on the stator and is arranged to satisfy the same requirements as the transformer.

The accompanying drawing illustrates this invention, Fig. 1 being a diagram of connections and Fig. 2 a vector diagram.

Fig. 1 shows typical connections for the case when a transformer is employed. The shunt commutator motor is represented by 1 and has its stator windings 2 connected to the alternating current supply 3. The commutator 4 of the motor is connected to one end of the secondary windings 6 of the transformer 5, which has its primary windings 7 connected in delta to the alternating current supply 3. The other ends of the transformer secondary windings are connected to the induction regulator 8. This regulator is of the well-known double construction, consisting of two similar regulators having their rotors mounted on a common shaft and their rotor windings 9 connected in series. The two primary windings 10 of the regulator units are connected to the alternating current supply 3, and the directions of rotation of the fluxes they set up are arranged so that movement of the regulator rotor advances the phase of one secondary voltage and retards the other.

The two units of the regulator can, of course, be dissimilar, and their rotors may be mounted on two separate but mechanically coupled shafts without interfering with the main features of the invention.

In Fig. 2 are shown the voltage vectors corresponding to one position of the regulator. E and E' represent the secondary voltages in the two units of the regulator, and $I_1$ is the secondary current shown in a typical phase position relative to the two voltages E and E' with normal connections. The torque due to each unit of the regulator is proportional to the rotor voltage and the component of the current in phase with the voltage, so that the resultant torque of the two units will be $$EI_1 \cos\phi_1 \text{ and } E'I_1 \cos\phi_1'$$

If a voltage is injected into the secondary circuit by a method such as has been described above, the current $I_1$ can be caused to take up a position $I_2$ where $$EI_2 \cos\phi_2 = E'I_2 \cos\phi_2'$$

thereby reducing the resultant torque to zero. If E and E' are equal $\phi_2$ and $\phi_2'$ would also be made equal but for cases in which E and E' are unequal, $\phi_2$ and $\phi_2'$ require to be unequal in order to satisfy the equation for zero torque.

It is obvious that zero torque can only be obtained for one condition of loading but a value of the injected voltage can be chosen so that approximate compensation is obtained over a range of loads.

What I claim as new and desire to secure by Letters Patent of the United States is:

1. An alternating-current motor provided with stator and rotor members, the stator member being provided with a polyphase primary winding and the rotor member being provided with a winding connected to a commutator and having brushes bearing on the commutator, a double induction regulator having primary windings energized in parallel to the polyphase primary winding of the motor and having secondary windings connected in series and to said brushes, the two primaries of the double induction regulator being connected to produce fluxes which rotate in opposite directions, and means including a transformer having a secondary winding in series with said brushes for injecting a voltage into the secondary circuit of said induction regulator, whereby the phase relation of the current therein is shifted in a direction and to an extent to substantially equalize the reverse torques of the two parts of the double induction regulator for the average regulating condition thereof.

2. In combination, a polyphase commutator motor having commutator brushes, a double induction regulator for regulation of said motor, said regulator having primary windings energized in parallel to produce reversely rotating fluxes and having secondary windings connected in series to said brushes, and a transformer having a delta-connected primary winding energized in parallel with the primary windings of the double induction regulator and a secondary winding in series with the secondary windings of the induction regulator, said transformer serving to shift the phase angle of the current flowing in the secondary windings of the induction regulator in such direction as will tend to compensate for the difference in torques of the two parts of the double induction regulator.

EMERSON C. BARWICK.